United States Patent
Marupaduga et al.

(10) Patent No.: US 10,574,334 B2
(45) Date of Patent: Feb. 25, 2020

(54) WIRELESS RELAY RADIO FREQUENCY (RF) INTERFERENCE MANAGEMENT

(71) Applicant: Sprint Communications Company L.P., Overland Park, KS (US)

(72) Inventors: Sreekar Marupaduga, Overland Park, KS (US); Vanil Parihar, Overland Park, KS (US); Nitesh Manchanda, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 444 days.

(21) Appl. No.: 15/418,390

(22) Filed: Jan. 27, 2017

(65) Prior Publication Data

US 2018/0219607 A1    Aug. 2, 2018

(51) Int. Cl.
| | |
|---|---|
| *H04B 7/14* | (2006.01) |
| *H04L 12/26* | (2006.01) |
| *H04W 72/08* | (2009.01) |
| *H04W 72/04* | (2009.01) |
| *H04L 5/00* | (2006.01) |
| *H04B 7/155* | (2006.01) |
| *H04W 88/04* | (2009.01) |

(Continued)

(52) U.S. Cl.
CPC ........... *H04B 7/14* (2013.01); *H04B 7/15542* (2013.01); *H04L 5/001* (2013.01); *H04L 5/0062* (2013.01); *H04L 43/16* (2013.01); *H04W 72/0453* (2013.01); *H04W 72/082* (2013.01); *H04W 84/047* (2013.01); *H04W 88/04* (2013.01); *H04W 88/08* (2013.01)

(58) Field of Classification Search
USPC .................................................. 370/310–350
See application file for complete search history.

(56) References Cited

U.S. PATENT DOCUMENTS

| | | |
|---|---|---|
| 7,486,933 B2 | 2/2009 | Lee et al. |
| 7,826,541 B2 | 11/2010 | Fujii et al. |
| 7,957,693 B2 | 6/2011 | Shimizu et al. |

(Continued)

OTHER PUBLICATIONS

Nokia Siemens Networks, et al.; "Use of Background Interference Matrix for Autonomous Component Carrier Selection for LTE-Advanced;" 3GPP TSG RAN WG1 #55-bis Meeting; Jan. 12-16, 2009; 7 pages; R1-090235; 3GPP; Ljubljana, Slovenia.

(Continued)

*Primary Examiner* — Alpus Hsu
*Assistant Examiner* — Hooman Houshmand

(57) ABSTRACT

A wireless relay manages Radio Frequency (RF) interference. A wireless access point in the relay wireless exchanges user data with wireless user devices using an amount of Carrier Aggregation Secondary Component Carriers (CA SCCs) in an RF band. A wireless network transceiver in the relay wireless exchanges the user data with a wireless communication network using a number of RF channels in the RF band. In response to excessive RF interference, the wireless access point wireless exchanges subsequent user data with the wireless user devices using a lower amount of the CA SCCs in the RF band. In response to the excessive RF interference, the wireless network transceiver wireless exchanges the subsequent user data with the wireless communication network using a lower number of RF channels in the RF band.

12 Claims, 7 Drawing Sheets

(51) Int. Cl.
*H04W 88/08* (2009.01)
*H04W 84/04* (2009.01)

(56) References Cited

U.S. PATENT DOCUMENTS

| | | | |
|---|---|---|---|
| 8,478,283 | B2 | 7/2013 | Periyalwar et al. |
| 8,660,035 | B2 | 2/2014 | Zhang et al. |
| 9,088,332 | B2 | 7/2015 | Boudreau et al. |
| 9,154,987 | B2 | 10/2015 | Redana et al. |
| 9,185,711 | B2 | 11/2015 | Lin et al. |
| 9,425,944 | B1 * | 8/2016 | Singh .................... H04L 5/0058 |
| 2006/0209721 | A1 | 9/2006 | Mese et al. |
| 2009/0175324 | A1 | 7/2009 | Sampath et al. |
| 2010/0118922 | A1 | 5/2010 | Ahn |
| 2010/0178875 | A1 * | 7/2010 | Oh ......................... H04B 7/022 455/63.1 |
| 2011/0105135 | A1 | 5/2011 | Krishnamurthy et al. |
| 2011/0212739 | A1 * | 9/2011 | Pedersen .............. H04J 11/0056 455/501 |
| 2011/0235582 | A1 | 9/2011 | Chen et al. |
| 2012/0015659 | A1 | 1/2012 | Kalyani et al. |
| 2013/0003580 | A1 * | 1/2013 | Kovacs ................ H04W 72/082 370/252 |
| 2013/0044654 | A1 * | 2/2013 | Chen ..................... H04L 5/0023 370/280 |
| 2013/0331077 | A1 * | 12/2013 | Mucke .................. H04L 5/0098 455/418 |
| 2014/0126403 | A1 * | 5/2014 | Siomina ................ H04W 24/10 370/252 |
| 2014/0328257 | A1 | 11/2014 | Kamlani |
| 2016/0143043 | A1 * | 5/2016 | Chendamarai Kannan ................. H04L 1/0002 370/329 |
| 2018/0007520 | A1 * | 1/2018 | Gustafson ............. H04L 1/1861 |

OTHER PUBLICATIONS

Luis G. U. Garcia, et al.; "Autonomous Component Carrier Selection: Interference Management in Local Area Environments for LTE-Advanced;" IEEE Communications Magazine; Sep. 2009; pp. 110-116; IEEE; Piscataway, U.S.A.

* cited by examiner

WIRELESS RELAY DATA STRUCTURE 400

WIRELESS RELAY DATA STRUCTURE 401

| RF INTERFERENCE LEVEL | CARRIER AGGREGATION SECONDARY COMPONENT CARRIERS | RF BACKHAUL CHANNELS |
|---|---|---|
| 1 | 3 | 4 |
| 2 | 2 | 3 |
| 3 | 1 | 2 |
| 4 | 0 | 1 |

FIGURE 4

WIRELESS RELAY RADIO FREQUENCY (RF) INTERFERENCE MANAGEMENT

TECHNICAL BACKGROUND

Data communication systems exchange user data for user devices to provide various data communication services. The user devices may be phones, computers, media players, and the like. The data communication services might be media streaming, audio/video conferencing, data messaging, or internet access. Wireless communication networks are deployed to extend the range and mobility of these data communication services.

The typical wireless communication network has several macro-cell base stations that provide radio coverage over large urban areas. The macro-cell base stations may still not be able to cover every part of the urban area with enough capacity. Outside of the urban areas, the macro-cell base stations may be too large for environments like inter-state highways and smaller towns. Wireless relays are deployed to alleviate these problems.

A wireless relay has a wireless access point to wirelessly communicate with user devices. The wireless relay also has wireless User Equipment (UE) to wirelessly communicate with macro-cell base stations or other relays. Thus, the macro-cell base stations serve both user devices and wireless relays, and the wireless relays also serve both user devices and wireless relays.

The wireless communication network uses RF bands for wireless communication. An RF band comprises a large swath of spectrum that is separated into RF channels. An exemplary RF band may be 200 Mega-Hertz (MHz) wide in the Gigi-Hertz (GHz) range and have ten 20 MHz channels. In a wireless relay, the wireless access point and the relay UE typically use different RF channels.

The wireless user devices and the wireless access point in the wireless relay use Carrier Aggregation (CA) links to exchange user data. The CA links use the RF band and RF channels. The CA links comprise a Primary Component Carrier (PCC) for network signaling and user data. The CA links include Secondary Component Carriers (SCCs) for additional user data. In some cases, the relay UE also uses CA for its network access.

Unfortunately, the UEs, wireless access points, relay UEs, and macro-cell base stations all interfere with one another across the RF channels. In particular, wireless relays may cause too much RF interference in densification scenarios when under a high load. The excessive RF interference degrades service quality for the wireless user devices.

TECHNICAL OVERVIEW

A wireless relay manages Radio Frequency (RF) interference. A wireless access point in the relay wireless exchanges user data with wireless user devices using an amount of Carrier Aggregation Secondary Component Carriers (CA SCCs) in an RF band. A wireless network transceiver in the relay wireless exchanges the user data with a wireless communication network using a number of RF channels in the RF band. In response to excessive RF interference, the wireless access point wireless exchanges subsequent user data with the wireless user devices using a lower amount of the CA SCCs in the RF band. In response to the excessive RF interference, the wireless network transceiver wireless exchanges the subsequent user data with the wireless communication network using a lower number of RF channels in the RF band.

DESCRIPTION OF THE DRAWINGS

FIG. 4 illustrates a wireless relay data structure to manage RF interference.

DETAILED DESCRIPTION

Figure 1:
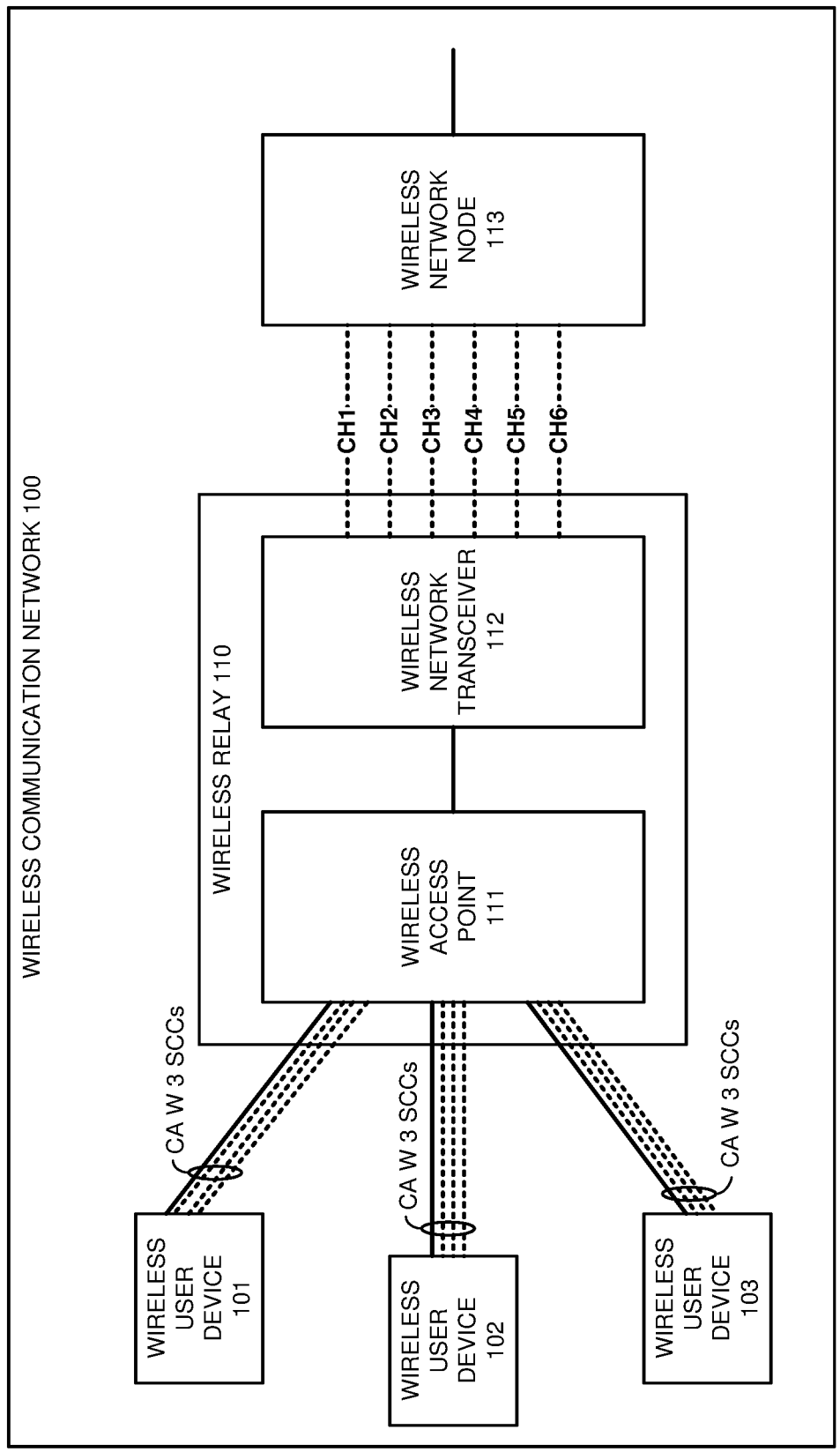
FIGS. 1-3 illustrate a wireless communication network with a wireless relay that manages Radio Frequency (RF) interference.
Figure 2:
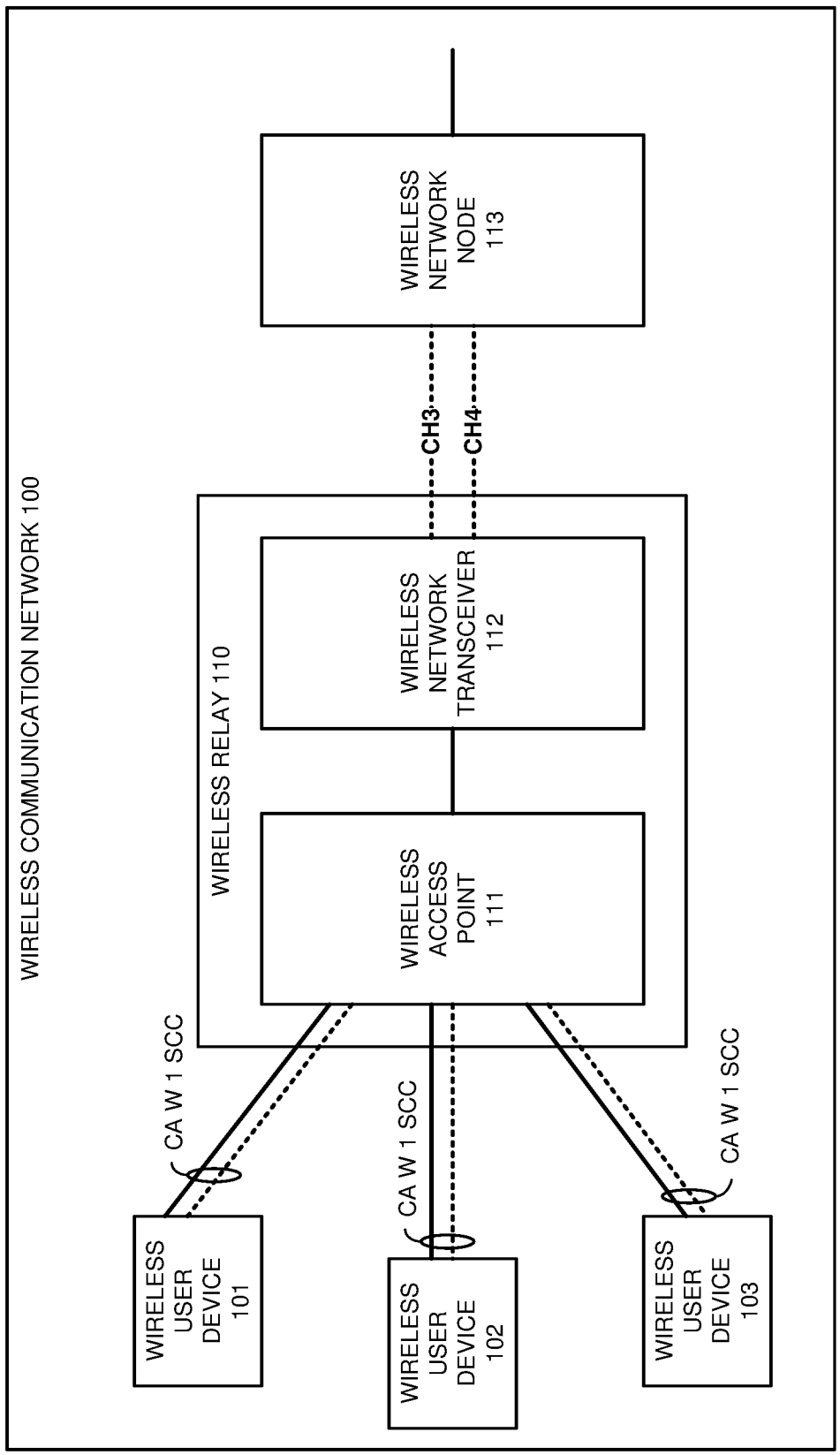
Figure 3:
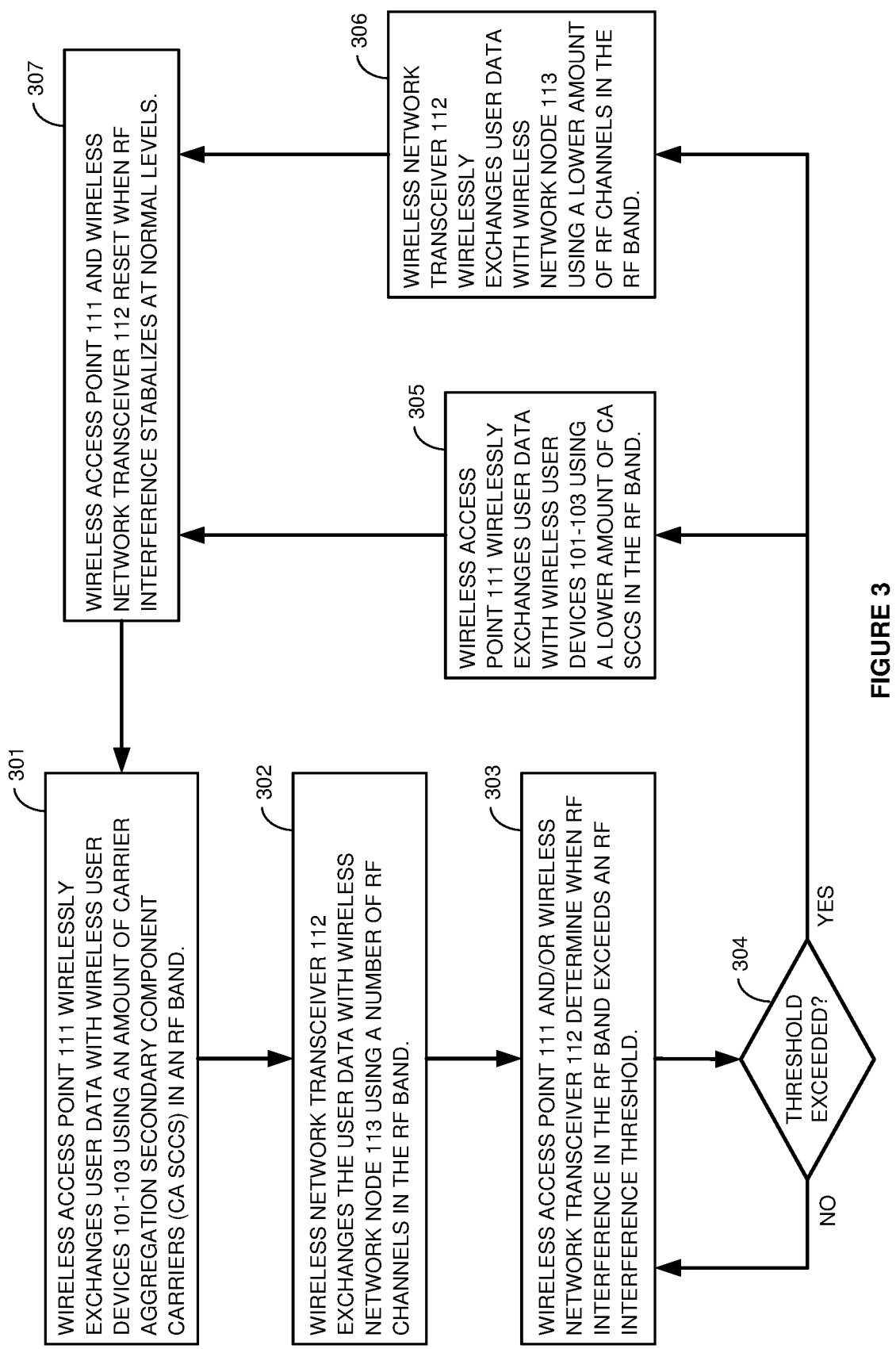

FIGS. 1-3 illustrate wireless communication network 100 with wireless relay 110 that manages Radio Frequency (RF) interference. Wireless communication network 100 exchanges user data for user devices like computers, phones, or some other intelligent machines. The user data exchange supports data services such as content streaming, media conferencing, machine communications, internet access, or some other computerized information service. Wireless communication network 100 is made of computer hardware like Central Processing Units (CPUs), Random Access Memory (RAM), persistent data storage, bus interfaces, and data transceivers. Wireless communication network 100 also has computer software like operating systems, applications, controllers, signaling interfaces, and interference managers.

Referring to FIG. 1, wireless communication network 100 comprises wireless user devices 101-103, wireless relay 110, and wireless network node 113. Wireless relay 110 comprises wireless access point 111 and wireless network transceiver 112. Wireless access point 111 and wireless network transceiver 112 communicate over a data link such as an Ethernet switch and connections.

Wireless user devices 101-103 comprise computers, phones, or some other intelligent machines with RF communication components. Wireless user devices 101-103 are made of computer hardware like data communication transceivers, bus interfaces, CPUs, RAM, data storage, and user interfaces. Some of the data communication transceivers include antennas, amplifiers, filters, and digital signal processors for wireless data communication. Wireless user devices 101-103 also have computer software like operating systems, networking modules, and user applications.

Wireless access point 111 could be a base station, evolved NodeB, computer, network appliance, or some other intelligent machine with RF communication components. Wireless access point 111 is made of computer hardware like data communication transceivers, bus interfaces, CPUs, RAM, and data storage. The data communication transceivers include antennas, amplifiers, filters, and digital signal processors for wireless data communication. Wireless access point 111 also has computer software like an operating system, baseband modules, networking modules, and network applications.

Wireless network transceiver 112 might be a computer, User Equipment (UE), or some other intelligent machine with RF communication components. Wireless network transceiver 112 is made of computer hardware like data communication transceivers, bus interfaces, CPUs, RAM, and data storage. The data communication transceivers include antennas, amplifiers, filters, and digital signal processors for wireless data communication. Wireless network transceiver 112 also has computer software like operating systems, networking modules, and network applications.

Wireless network node 113 could be a base station, computer, network appliance, or some other intelligent machine with RF communication components. Wireless network node 113 is made of computer hardware like data communication transceivers, bus interfaces, CPUs, RAM, and data storage. Some of the data communication transceivers include antennas, amplifiers, filters, and digital signal processors for wireless data communication. Wireless network node 113 also has computer software like an operating system, baseband modules, networking modules, and network applications. Wireless network node 113 is coupled to a core data network that comprises gateways, controllers, and the like. The core network is not shown for clarity.

Wireless user devices 101-103 and wireless access point 111 exchange user data over wireless Carrier Aggregation (CA) links in Radio Frequency (RF) channels of an RF band. The RF band comprises a large swath of spectrum that is separated into a number of RF channels. An exemplary RF band may be 200 Mega-Hertz (MHz) wide in the Gigi-Hertz (GHz) range and have ten 20 MHz channels. The CA links comprise a Primary Component Carrier (PCC) for network signaling and user data. The CA links typically include Secondary Component Carriers (SCCs) for user data. In this illustration, each CA link initially has one PCC and three SCCs. Wireless access point 111 and wireless network transceiver 112 exchange the user data over their data link.

Wireless network transceiver 112 and wireless network node 113 exchange the user data over RF channels (CH) in the RF band. In this example, wireless network transceiver 112 uses six RF channels in the RF band. Wireless user devices 101-103 and wireless access point 111 use different RF channels (7-N) in the same RF band for their CA links. Wireless network transceiver 112 and wireless network node 113 may also use CA links with a PCC and SCCs in RF channels 1-6.

Wireless access point 111 and/or wireless network transceiver 112 monitor the RF band and RF channels for RF interference. RF interference comprises the amount of unwanted RF energy in the RF band or channel that is above the ambient RF noise level. Each network element in wireless communication network (101-103 and 111-113) generates RF interference in the RF channels in the RF band. In particular, a given network element using one RF channel will cause RF interference in the other RF channels in the RF band.

Wireless access point 111 and/or wireless network transceiver 112 determines when RF interference in the RF band exceeds an RF interference threshold. RF interference thresholds may be applied per RF channel or channel group. Wireless access point 111 and wireless network transceiver 112 exchange data indicating the excessive RF interference.

In response to the excessive RF interference, wireless access point 111 lowers the amount of CA SCCs in that it uses in the RF band. For example, wireless user devices 101-103 and wireless access point 111 may exchange user data over with one or two CA SCCs in the RF band instead of three. Also in response to the excessive RF interference, wireless network transceiver 112 lowers the number of RF channels that is uses in the RF band. For example, wireless network transceiver 112 and wireless network node 113 may exchange subsequent user data over one or two RF channels in the RF band instead of six. In other examples, wireless network transceiver 112 and wireless network node 113 may lower their number of CA SCCs in RF channels 1-6. In yet other examples, wireless network transceiver 112 and wireless network node 113 lower their number of Orthogonal Frequency Division Multiplex (OFDM) resource blocks in the RF band.

Referring to FIG. 2, wireless communication network 100 is shown after excessive RF interference has been detected and mitigating action has been taken. Wireless user devices 101-103 and wireless access point 111 exchange user data over wireless CA links in RF channels of the RF band. The CA links comprise one PCC for and one SCC instead on three SCCs. Wireless access point 111 and wireless network transceiver 112 exchange the user data over their data link.

Wireless network transceiver 112 and wireless network node 113 exchange the user data over two RF channels (CH3 and CH4) in the RF band. Wireless user devices 101-103 and wireless access point 111 use different RF channels (7-N) in the RF band for their CA links. Wireless network transceiver 112 and wireless network node 113 may also use CA links with a PCC and fewer SCCs in RF channels 3-4.

Referring to FIG. 3, the operation of wireless communication network 100 is illustrated. Wireless user devices 101-103 and wireless access point 111 exchange user data using an amount of CA SCCs in the RF band (301). Wireless network transceiver 112 and wireless network node 113 exchange the user data over an amount of RF channels in the RF band.

Wireless access point 111 and/or wireless network transceiver 112 determine when RF interference in the RF band exceeds an RF interference threshold (303). If the RF interference exceeds the RF interference threshold (304), then wireless access point 111 and wireless user devices 101-103 exchange user data over a lower amount of CA SCCs (305). If the RF interference exceeds the RF interference threshold (304), then wireless network transceiver 112 and wireless network node 113 exchange user data over a lower amount of RF channels (306). When the RF interference subsides and stabilizes at an acceptable level, wireless network transceiver 112 and wireless network node 113 reset (307) and operations return to their initial state (301).

FIG. 4 illustrates wireless relay 400 having data structure 401 to manage RF interference. Wireless relay data structure 401 has three columns: RF interference level, CA SCCs, and RF backhaul channels. The RF interference levels are representative at 1, 2, 3, and 4. Actual RF interference levels and ranges could be assigned to these four (or more) RF interference levels. The number of CA SCCs drops 3-2-1-0 as the RF interference levels rise 1-2-3-4. Different numbers of SCCs and drop rates could be used. The number of RF backhaul channels drops 4-3-2-1 as the RF interference levels rise 1-2-3-4. Different numbers of RF channels and drop rates could be used.

When wireless relay 400 detects RF interference at level 1, wireless relay 400 reduces the number of CA SCCs to 3 and the number of RF backhaul channels to 4. Wireless relay 400 returns to the initial state when the RF interference goes below level 1. When wireless relay 400 detects RF interference at level 2, wireless relay 400 reduces the number of CA SCCs to 2 and the number of RF backhaul channels to 3. Wireless relay 400 returns to 3 CA SCCs and 4 RF backhaul channels when the RF interference returns to level 1. When wireless relay 400 detects RF interference at level 3, wireless relay 400 reduces the number of CA SCCs to 1 and the number of RF backhaul channels to 2. Wireless relay 400 returns to 2 CA SCCs and 3 RF backhaul channels when the RF interference returns to level 2. When wireless relay 400 detects RF interference at level 4, wireless relay 400 reduces the number of CA SCCs to 0 and the number of RF backhaul channels to 1. Wireless relay 400 returns to 1 CA SCC and 2 RF backhaul channels when the RF interference returns to level 3.

Figure 5:
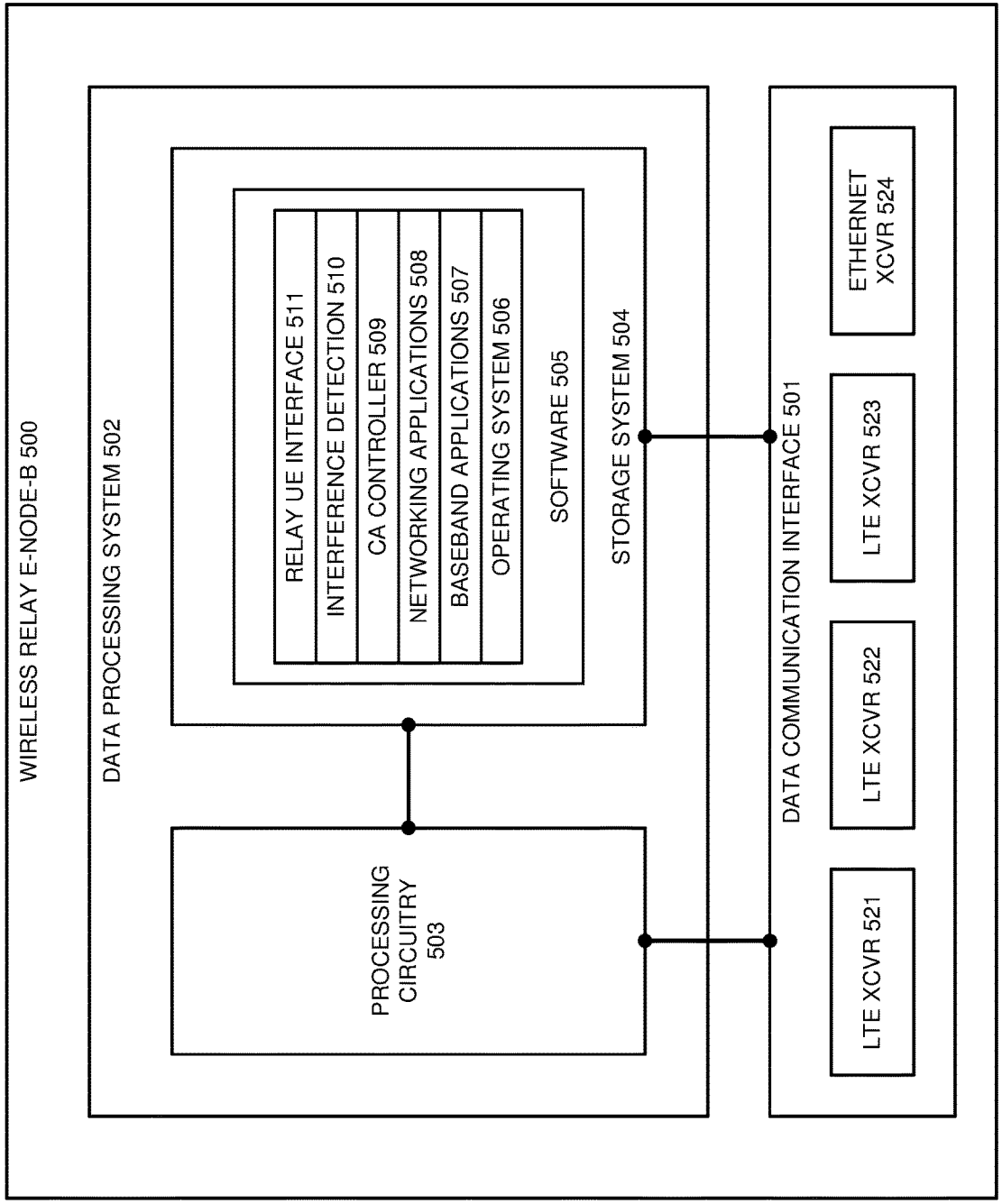
FIG. 5 illustrates a wireless relay eNodeB to manage RF interference.

FIG. 5 illustrates wireless relay eNodeB 500 to manage RF interference. Wireless relay eNodeB 500 is an example of wireless access point 111 and wireless relay 400, although these systems may use alternative configurations and operations. Wireless relay eNodeB 500 comprises data communication interface 501 and data processing system 502. Data communication interface 501 comprises Long Term Evolution (LTE) transceivers 521-523 and Ethernet transceiver 524. Data processing system 502 comprises processing circuitry 503 and storage system 504. Storage system 504 stores software 505. Software 505 includes respective software modules 506-511.

LTE transceivers 521-523 comprise communication components, such as antennas, amplifiers, filters, modulators, signal processors, ports, bus interfaces, memory, software, and the like. Ethernet transceiver 524 comprise communication components, such as ports, bus interfaces, signal processors, memory, software, and the like. Processing circuitry 503 comprises server blades, circuit boards, bus interfaces, CPUs, integrated circuitry, and associated electronics. Storage system 504 comprises non-transitory, machine-readable, data storage media, such as flash drives, disc drives, memory circuitry, servers, and the like. Software 505 comprises machine-readable instructions that control the operation of processing circuitry 503 when executed.

Wireless relay eNodeB 500 may be centralized or distributed. All or portions of software 506-511 may be externally stored on one or more storage media, such as circuitry, discs, and the like. Some conventional aspects of wireless relay eNodeB 500 are omitted for clarity, such as power supplies, enclosures, and the like. When executed by processing circuitry 503, software modules 506-511 direct circuitry 503 to perform the following operations.

Operating system 506 interfaces between software modules 507-511 and the eNodeB hardware (processing circuitry 503, data communication interface 501, RAM, storage). Baseband applications 507 control user access RF protocols for user devices. Networking applications 508 control network RF protocols for network access. CA controller 509 interacts with baseband applications 507 to control CA and amounts of SCCs. Interference detection 510 monitors RF interference and notifies CA controller 509 when RF interference levels become excessive or subside. Relay UE interface 511 exchanges user data and RF interference data with a UE in the wireless relay.

Figure 6:
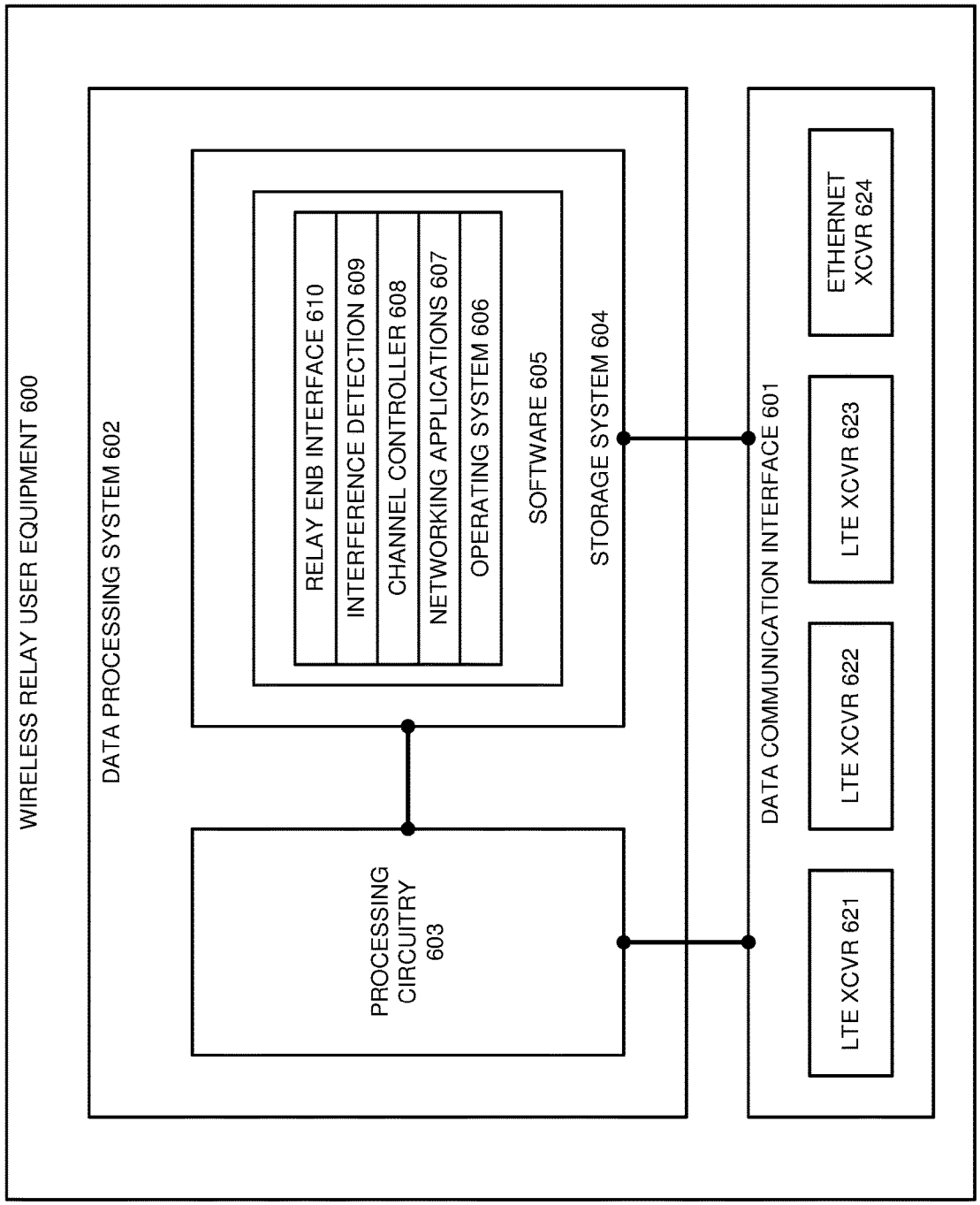
FIG. 6 illustrates wireless relay user equipment to manage RF interference.

FIG. 6 illustrates wireless relay user equipment 600 to manage RF interference. Wireless relay User Equipment (UE) 600 is an example of wireless network transceiver 112 and wireless relay 400, although these systems may use alternative configurations and operations. Wireless relay UE 600 comprises data communication interface 601 and data processing system 602. Data communication interface 601 comprises LTE transceivers 621-623 and Ethernet transceiver 624. Data processing system 602 comprises processing circuitry 603 and storage system 604. Storage system 604 stores software 605. Software 605 includes respective software modules 606-610.

LTE transceivers 621-623 comprise communication components, such as antennas, amplifiers, filters, modulators, signal processors, ports, bus interfaces, memory, software, and the like. Ethernet transceiver 624 comprise communication components, such as ports, bus interfaces, signal processors, memory, software, and the like. Processing circuitry 603 comprises server blades, circuit boards, bus interfaces, CPUs, integrated circuitry, and associated electronics. Storage system 604 comprises non-transitory, machine-readable, data storage media, such as flash drives, disc drives, memory circuitry, servers, and the like. Software 605 comprises machine-readable instructions that control the operation of processing circuitry 603 when executed.

Wireless relay UE 600 may be centralized or distributed. All or portions of software 606-610 may be externally stored on one or more storage media, such as circuitry, discs, and the like. Some conventional aspects of wireless relay UE 600 are omitted for clarity, such as power supplies, enclosures, and the like. When executed by processing circuitry 603, software modules 606-610 direct circuitry 603 to perform the following operations.

Operating system 606 interfaces between software modules 607-610 and the UE hardware (processing circuitry 603, data communication interface 601, RAM, storage). Networking applications 607 control network RF protocols for network access. Channel controller 608 interacts with networking applications 607 to control the RF channels used for backhaul. Interference detection 609 monitors RF interference and notifies channel controller 608 when RF interference levels become excessive or subside. Relay eNodeB (ENB) interface 610 exchanges user data and RF interference data with an eNodeB in the wireless relay.

Figure 7:
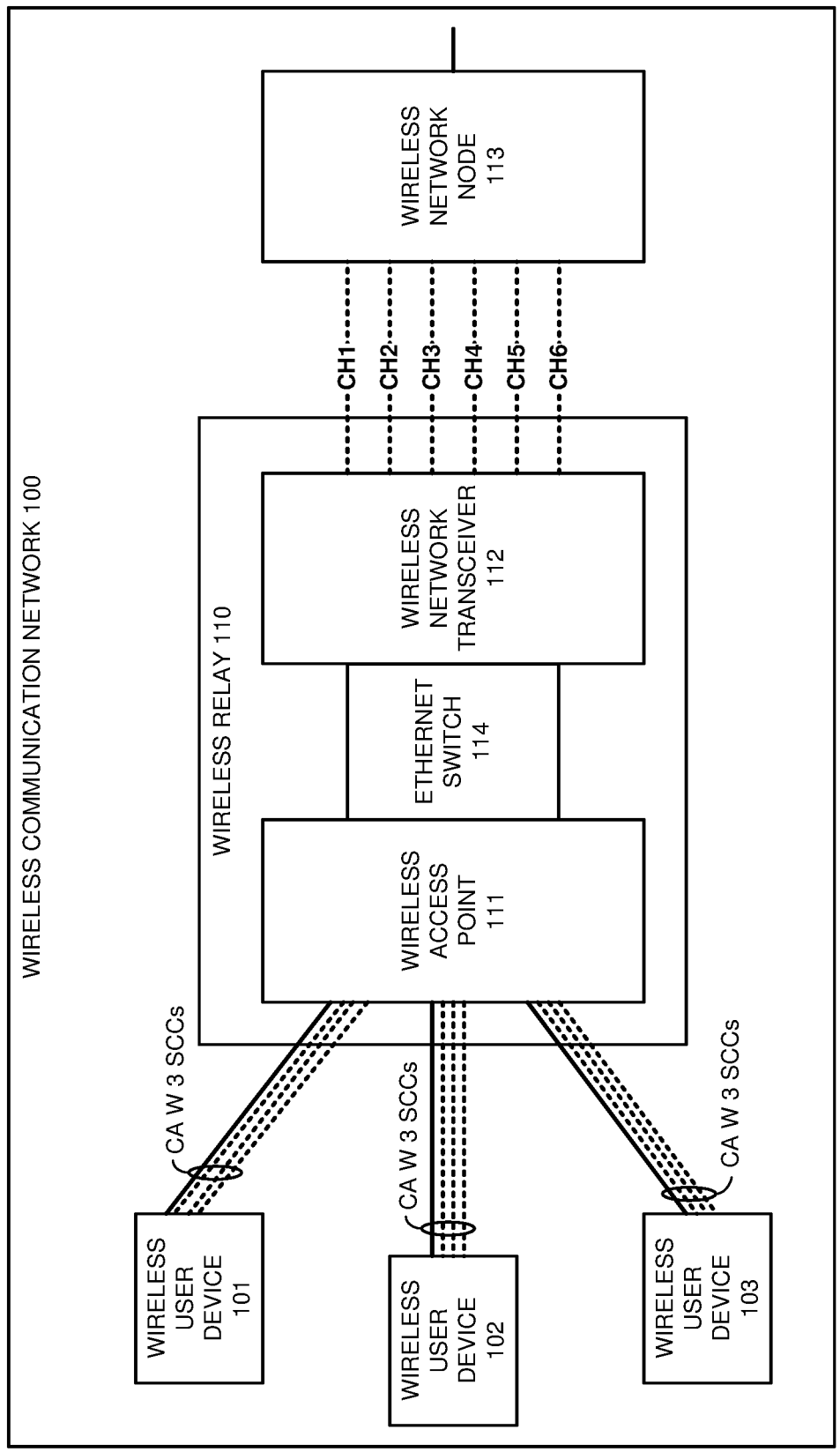
FIG. 7 illustrates a wireless communication network with an Ethernet switch that manages RF interference.

Referring to FIG. 7, wireless communication network 100 comprises wireless user devices 101-103, wireless relay 110, and wireless network node 113. Wireless relay 110 comprises wireless access point 111 and wireless network transceiver 112. Wireless access point 111 and wireless network transceiver 112 communicate over Ethernet switch 114 and connections.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless relay-comprising a wireless access point and a wireless network transceiver to manage Radio Frequency (RF) interference, the method comprising:

the wireless access point wirelessly exchanging user data with wireless user devices using an amount of Carrier Aggregation Secondary Component Carriers (CA SCCs) in an RF band;

the wireless network transceiver exchanging the user data with a wireless communication network using a number of RF channels in the RF band;

the wireless access point determining when RF interference in the RF band exceeds an RF interference threshold and notifying the wireless network transceiver over an Ethernet switch when the RF interference in the RF band exceeds the RF interference threshold;

responsive to the excessive RF interference, the wireless access point wirelessly exchanging subsequent user data with the wireless user devices using a lower amount of the CA SCCs in the RF band;

responsive to the excessive RF interference, the wireless network transceiver wirelessly exchanging the subsequent user data with the wireless communication network using a lower number of RF channels in the RF band; and the wireless network transceiver resetting when the RF interference stabilizes to an acceptable level.

2. The method of claim 1 wherein the wireless network transceiver exchanging the subsequent user data with the wireless communication network using the lower number of RF channels in the RF band comprises the wireless network transceiver exchanging the subsequent user data with the wireless communication network using a single RF channel in the RF band.

3. The method of claim 1 wherein the wireless network transceiver exchanging the subsequent user data with the wireless communication network using the lower number of RF channels in the RF band comprises the wireless network transceiver exchanging the subsequent user data with the wireless communication network using designated resource blocks in the RF band.

4. The method of claim 1 wherein:
the wireless network transceiver exchanging the user data with the wireless communication network using the number of RF channels in the RF band comprises the wireless network transceiver exchanging the user data with the wireless communication network using an amount of the CA SCCs in the RF band; and
the wireless network transceiver exchanging the subsequent user data with the wireless communication network using the lower number of RF channels in the RF band comprises the wireless network transceiver exchanging the subsequent user data with the wireless communication network using a lower amount of the CA SCCs in the RF band.

5. The method of claim 1 wherein the wireless access point comprises an evolved NodeB.

6. The method of claim 1 wherein the wireless network transceiver comprises wireless User Equipment (UE).

7. A wireless relay comprising to manage Radio Frequency (RF) interference comprising:
a wireless access point configured to wirelessly exchange user data with wireless user devices using an amount of Carrier Aggregation Secondary Component Carriers (CA SCCs) in an RF band;
a wireless network transceiver configured to exchange the user data with a wireless communication network using a number of RF channels in the RF band;
the wireless access point configured to determine when RF interference in the RF band exceeds an RF interference threshold and notify the wireless network transceiver over an Ethernet switch when the RF interference in the RF band exceeds the RF interference threshold;
the wireless access point configured, responsive to the excessive RF interference, to wirelessly exchange subsequent user data with the wireless user devices using a lower amount of the CA SCCs in the RF band;
the wireless network transceiver configured, responsive to the excessive RF interference, to wirelessly exchange the subsequent user data with the wireless communication network using a lower number of RF channels in the RF band; and
the wireless network transceiver configured to reset when the RF interference stabilizes to an acceptable level.

8. The wireless relay of claim 7 wherein the wireless network transceiver is configured to exchange the subsequent user data with the wireless communication network using a single RF channel in the RF band.

9. The wireless relay of claim 7 wherein the wireless network transceiver is configured to exchange the subsequent user data with the wireless communication network using designated resource blocks in the RF band.

10. The wireless relay of claim 7 wherein:
the wireless network transceiver is configured to exchange the user data with the wireless communication network using an amount of the CA SCCs in the RF band; and
the wireless network transceiver is configured to exchange the subsequent user data with the wireless communication network using a lower amount of the CA SCCs in the RF band.

11. The wireless relay of claim 7 wherein the wireless access point comprises an evolved NodeB.

12. The wireless relay of claim 7 wherein the wireless network transceiver comprises wireless User Equipment (UE).

* * * * *